US009834367B1

(12) United States Patent
Veltri

(10) Patent No.: US 9,834,367 B1
(45) Date of Patent: Dec. 5, 2017

(54) MEDICINE BOTTLE CAP

(71) Applicant: Douglas Veltri, Carlstadt, NJ (US)

(72) Inventor: Douglas Veltri, Carlstadt, NJ (US)

( * ) Notice: Subject to any disclaimer, the term of this patent is extended or adjusted under 35 U.S.C. 154(b) by 0 days.

(21) Appl. No.: 15/478,098

(22) Filed: Apr. 3, 2017

Related U.S. Application Data

(60) Provisional application No. 62/317,526, filed on Apr. 2, 2016.

(51) Int. Cl.

| | |
|---|---|
| ***A01B 1/00*** | (2006.01) |
| ***B65D 83/04*** | (2006.01) |
| ***A61J 1/03*** | (2006.01) |
| ***A61J 7/00*** | (2006.01) |
| ***B65D 43/16*** | (2006.01) |
| ***B65D 41/04*** | (2006.01) |
| ***B65D 51/24*** | (2006.01) |
| ***B65D 51/18*** | (2006.01) |

(52) U.S. Cl.
CPC .............. *B65D 83/049* (2013.01); *A61J 1/03* (2013.01); *A61J 7/0076* (2013.01); *B65D 41/04* (2013.01); *B65D 43/163* (2013.01); *B65D 51/18* (2013.01); *B65D 51/248* (2013.01); *B65D 83/0409* (2013.01); *B65D 2251/009* (2013.01); *B65D 2251/0021* (2013.01); *B65D 2251/0028* (2013.01); *B65D 2251/0078* (2013.01)

(58) Field of Classification Search
CPC .. G06F 17/00; B65G 59/00; A61J 1/03; A61J 7/0409; A61J 1/1412; A61J 2200/30; A61J 7/0076; A61J 7/04; G07F 17/0092
USPC .... 700/236, 237; 221/154, 199, 2, 277, 306, 221/4, 7; 340/687
See application file for complete search history.

(56) References Cited

U.S. PATENT DOCUMENTS

| | | | | | |
|---|---|---|---|---|---|
| 4,523,694 | A * | 6/1985 | Veltri | B65D 83/0409 | 221/265 |
| 7,100,797 | B2 * | 9/2006 | Kahn | A61J 7/0076 | 221/263 |
| 7,405,647 | B2 * | 7/2008 | Rosche | A61J 7/0472 | 215/219 |
| 7,408,843 | B2 * | 8/2008 | Brandon | A61J 7/0472 | 215/329 |
| 2008/0117719 | A1 * | 5/2008 | Hildebrandt | A61J 7/0472 | 368/10 |
| 2009/0200327 | A1 * | 8/2009 | Jurkovich | A61J 7/0409 | 221/3 |
| 2012/0223091 | A1 * | 9/2012 | Bond | A61J 7/02 | 221/7 |
| 2013/0116818 | A1 * | 5/2013 | Hamilton | A61J 7/04 | 700/236 |
| 2013/0292354 | A1 * | 11/2013 | Xu | A61J 7/04 | 215/230 |
| 2014/0074283 | A1 * | 3/2014 | Blackburn | A61J 7/0076 | 700/237 |
| 2015/0008152 | A1 * | 1/2015 | Xu | A61J 1/03 | 206/538 |

(Continued)

*Primary Examiner* — Timothy Waggoner
*Assistant Examiner* — Ayodeji Ojofeitimi

(57) ABSTRACT

A medicine bottle cap includes a flip-top assembly and an outer cap pivotably attached to the flip top assembly and having an interior wall of the side wall that includes gear teeth. The medicine bottle cap further includes a pill delivery gear having gear teeth that engage the gear teeth in the outer cap and an inner cap having a slot for receiving a tab from the pill delivery gear for rotation thereof.

11 Claims, 9 Drawing Sheets

(56) References Cited

U.S. PATENT DOCUMENTS

| | | | | |
|---|---|---|---|---|
| 2015/0360834 | A1* | 12/2015 | Mikhail ................ | A61J 1/1425<br>340/384.5 |
| 2016/0253477 | A1* | 9/2016 | Xu ...................... | G06F 19/3462<br>340/687 |

* cited by examiner

MEDICINE BOTTLE CAP

CROSS REFERENCE TO RELATED APPLICATION

This application claims the benefit of U.S. Provisional Application No. 62/317,526, filed Apr. 2, 2016, which is hereby incorporated by reference.

BACKGROUND OF THE DISCLOSURE

The embodiments of the present invention relate to a smart cap for dispensing medicine from a medicine bottle. The inventor, Mr. Doug Veltri, is passionate about bringing smart technology to medicine bottles and in particular, medicine bottle caps, to provide a better, safer, and more effective means of dispensing medicine. It is well known in the art that medicine bottles include instructions on a label on the surface of the bottle. The instructions commonly include difficult to read texts that are too small, too brief, and generally not helpful. Senior citizens and others with impaired vision have a difficult time reading and understanding these instructions. This raises a public safety concern as it is critically important for individuals especially senior citizens to take their medicine at a certain time, day, and prescribed dosage. In addition, it is well known in the art that once a medicine cap has been removed from the medicine bottle, it is difficult to control the number of pills being dispensed. For example, some caps are so difficult to open that once they are opened, the medicine spills out that a volcanic event causing the pills to spew over the counter and floor. There is a need for smarter medicine bottle caps in the marketplace.

Mr. Veltri was the sole inventor on U.S. Pat. No. 4,523, 694 ("the '694 patent"), which issued on Jun. 18, 1995, and is related to a dispensing cap for medicine bottles. However, the subject patent application includes improvements to the technology in the '694 patent and technical features materially different to the technical details described in the '694 patent.

There continues to be a need for smart technology in the medicine bottle cap field that will help a person take medicine at a certain time and prescribed dosage. In addition, there is a need to control the amount of medicine being dispensed from a medicine bottle.

SUMMARY OF THE DISCLOSURE

An embodiment of the medicine bottle cap includes a flip-top assembly having a flip top inner cap having a top surface and side walls, where the top surface of the flip top inner cap includes a first plurality of openings. The flip top inner cap also includes a sound circuit board that includes at least two batteries and a plurality of switches, a speaker wired to the sound circuit board, a flip top outer cap having a top surface and side walls, where the top surface of the flip top outer cap includes a second plurality of openings.

An embodiment of the medicine bottle cap further includes an outer cap pivotably attached to the flip top assembly and having a top surface and side walls, where the top surface of the outer cap includes a medicine exit port disposed in a center of the top surface of the outer cap, where an interior wall of the side wall of the outer cap includes a first plurality of gear teeth.

An embodiment of the medicine bottle cap further includes a pill delivery gear having a second plurality of gear teeth for engaging the first plurality of gear teeth in the outer cap, further having a chamber having an opening for medicine to pass there through. The embodiment further includes a circular post protruding from a center portion of a lower surface of the pill delivery gear, and a tab protruding from the lower surface of the pill delivery gear.

An embodiment of the medicine bottle cap further includes an inner cap having a top surface and a lower surface, the top surface of the inner cap having an opening designed to receive the post from the pill delivery gear. The embodiment also includes a slot for receiving the tab from the pill delivery gear and an opening designed to allow medicine in a medicine bottle to pass there through.

Another embodiment of the medicine bottle cap further includes a medicine bottle cap where the outer cap is pivotably attached to the flip top assembly via a hinge.

Another embodiment of the medicine bottle cap further includes a medicine bottle cap connected to a medicine bottle.

Yet another embodiment of the medicine bottle cap includes a flip top inner cap having a circular shape.

Yet another embodiment of the medicine bottle cap further includes a flip top inner cap that includes at least one notch included in a section of the side wall.

For an embodiment of the medicine bottle cap, when the flip top cap is in the closed position, an actuator depresses a switch on the sound circuit board, and where, when the flip top cap is moved to the open position, a recorded message plays.

An embodiment of the medicine bottle cap further includes features directed to a top surface of the outer cap also which includes a sound board switch actuator and a snap-fit member to connect the outer cap to the flip top outer cap.

An embodiment of the medicine bottle cap further includes side walls of the outer cap having a knurled design.

Another embodiment of the medicine bottle cap where the first plurality of gear teeth are disposed on a 180 degree to 360 degree inner circumference of the interior wall of the side wall of the outer cap.

An embodiment of the medicine bottle cap further includes a chamber that includes different designs including circular, rectangular and oval to allow for the dispensing of different sizes and different shapes of medicine.

Another embodiment of the medicine bottle cap includes a slot having a crescent shape.

BRIEF DESCRIPTION OF THE DRAWINGS

FIG. 4C showing a bottom view.

FIG. 5B showing a bottom, side view; FIG. 5C showing a bottom view; and FIG. 5D showing a top view.

FIG. 6B from the side and top; FIG. 6C from the side and bottom;

FIG. 6D from the bottom; and FIG. 6E from the side.

FIGS. 7C and 7D showing different side views.

DETAILED DESCRIPTION OF THE EMBODIMENTS OF THE PRESENT INVENTION

Figure 1:
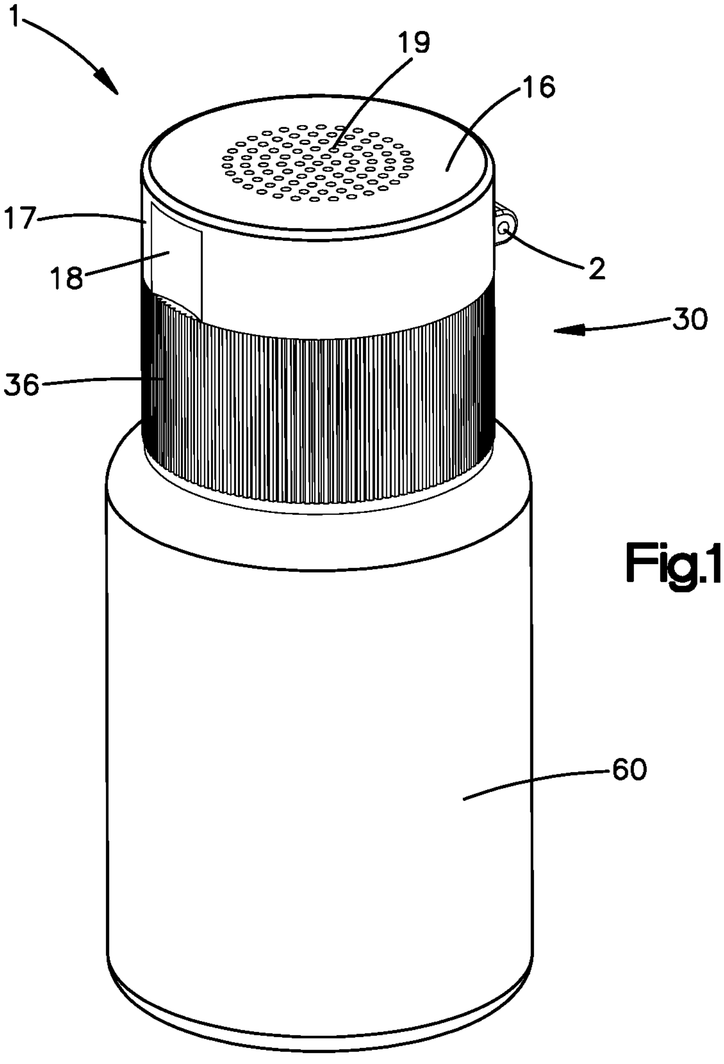
FIG. 1 shows a side view of an embodiment of the cap disposed on a medicine bottle, with the cap shown in a closed position on top of the bottle.

FIG. 1 shows a side view of an embodiment of the cap disposed on a medicine bottle, with the cap shown in the closed position on top of the bottle. The features shown include the flip top assembly 1, the outer cap 30, and the medicine bottle 60. All these features will be described in more detail below.

Figure 2:
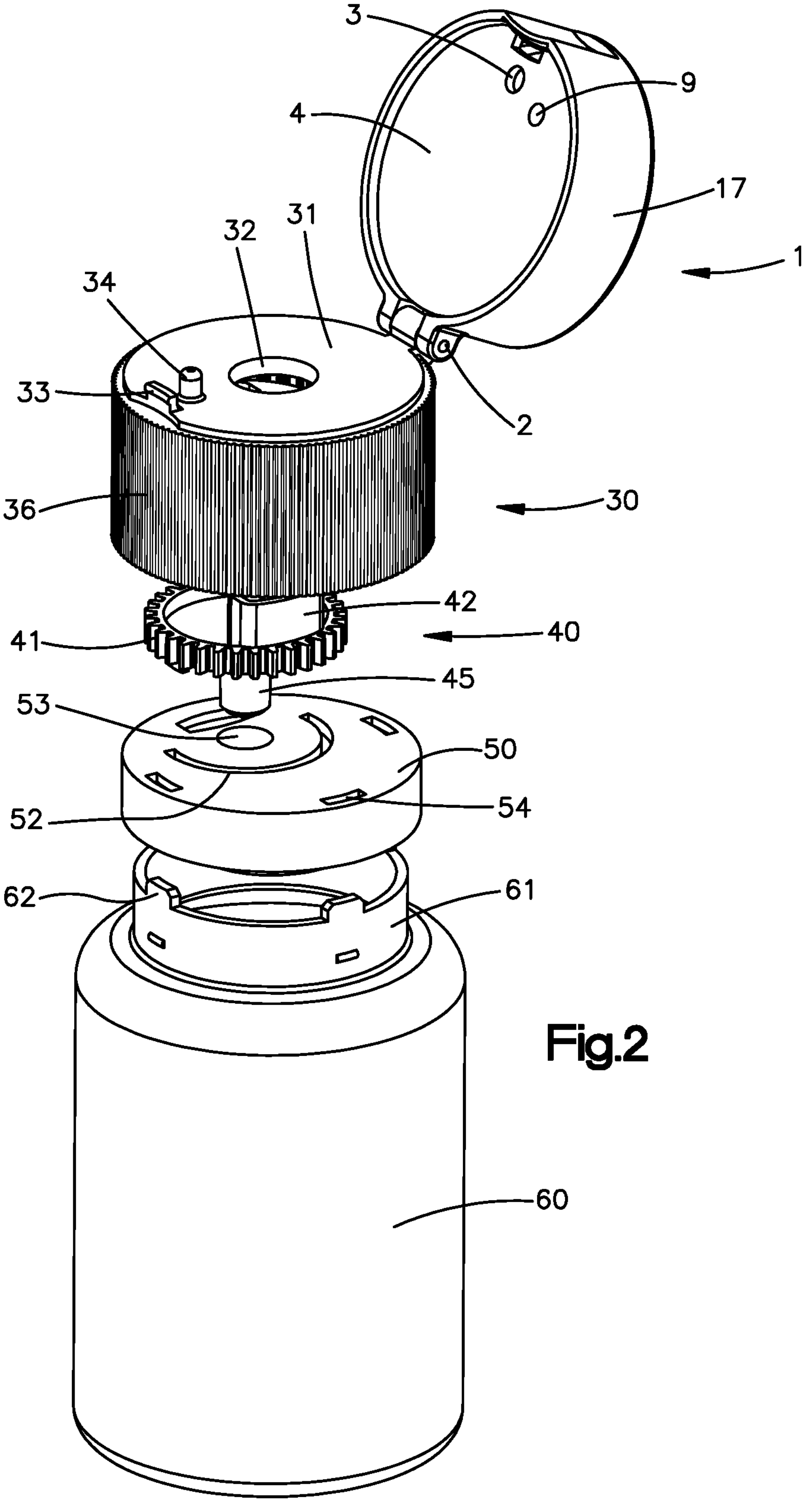
FIG. 2 shows an exploded view of the plurality of features in an embodiment of the cap, disposed above the top of a medicine bottle to show the disposition of the various features and assembly position.

FIG. 2 shows an exploded view of the plurality of features in an embodiment of the cap, disposed above the top of a medicine bottle to show the disposition of the various features and assembly position. The features shown include the flip top assembly 1 shown in the open position; the outer cap 30 pivotably attached to the flip top assembly 1 via hinge 2; the pill delivery gear 40; inner cap 50; and the medicine bottle 60. These features are shown in a vertical orientation to show their assembly position and how the various features will interact when assembled. All these features will be described in more detail below.

Figure 3:
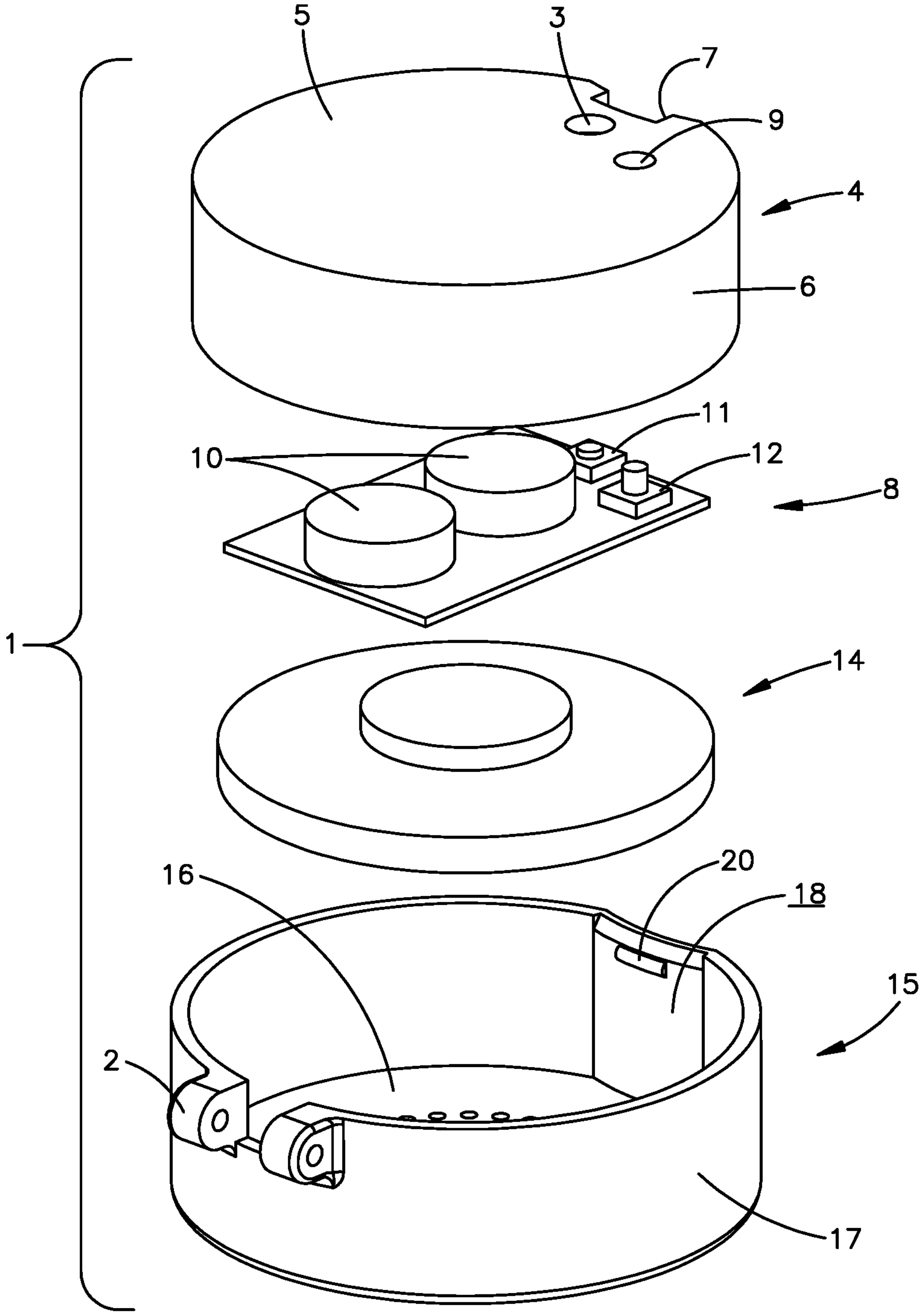
FIG. 3 shows an exploded view of the features included in the flip top cap.

FIG. 3 shows an exploded view of the flip top cap 1 showing the flip top inner cap 4 at the top of the page. More specifically, the flip top inner cap 4 includes a preferred circular shape having a top surface 5, side walls 6 and at least one notch 7 included in a section of the side wall 6. The top surface 5 includes a plurality of openings 3, 9 as shown in FIG. 3. The openings 3, 9 are circular in shape and preferably include only two openings 3, 9 as shown in FIG. 3. However, a person of ordinary skill in the art will readily understand that the openings 3, 9 can include a number of different shapes and more than two openings.

FIG. 3 also shows a sound circuit board 8 that includes at least two batteries 10 and switches 11 and 12, with each switch having an actuator post and a horizontal portion including stored data. When the flip top cap 1 is in the closed position on the medicine bottle as shown in FIG. 1, the switch's actuator depresses a switch on the sound board. When the flip top cap is in the open position as shown in FIG. 2, the switch opens, and a recorded message plays. The switch 12 can be depressed by a user to record a custom message. The switch 11 in this embodiment is preferably used as an actuator switch, to activate the message when flip top cap 1 is opened. FIG. 3 also shows a speaker 14 wired to the sound circuit board 8.

FIG. 3 further shows a flip top outer cap 15 at the bottom of the page. More specifically, the flip top outer cap 15 includes a preferred circular shape having a top surface 16 (see FIG. 1 for a better view), side walls 17 and at least one notch 18 included in a section of the side wall 17. The top surface 16 includes a plurality of openings 19 as best shown in FIG. 1 to allow a user to more readily hear the recorded message when the flip top cap 1 is opened. The openings 19 are circular in shape and preferably are included in a circular design as shown in FIG. 1. However, a person of ordinary skill in the art will readily understand that the openings 19 can include a number of different shapes and varying number of openings with different overall designs on its top surface 16. The flip top outer cap 15 also includes a known in the art hinge 2 to allow the "flip" top operation to occur and connects the flip top cap 1 to the outer cap 30; other hinge assemblies known in the art are included in the scope of this patent application and include not only the dual post hinge assembly shown in FIG. 3, but also single post assemblies and others known by a person of ordinary skill in the art. The flip top outer cap 15 also includes a notch 18 that matches or corresponds to the notch 7 on the flip top inner cap 4. An inside portion of the side wall 17 of the notch 18 includes a protrusion 20 that snaps to the flip top inner cap 4 when the flip top cap 1 is closed and ready for use. A person of ordinary skill in the art also understands that there are other means other than the hinge described above that can be used to connect the flip top assembly to the outer cap including ball in a socket assemblies, snap on, screw on, and related connection means.

Figure 4A:
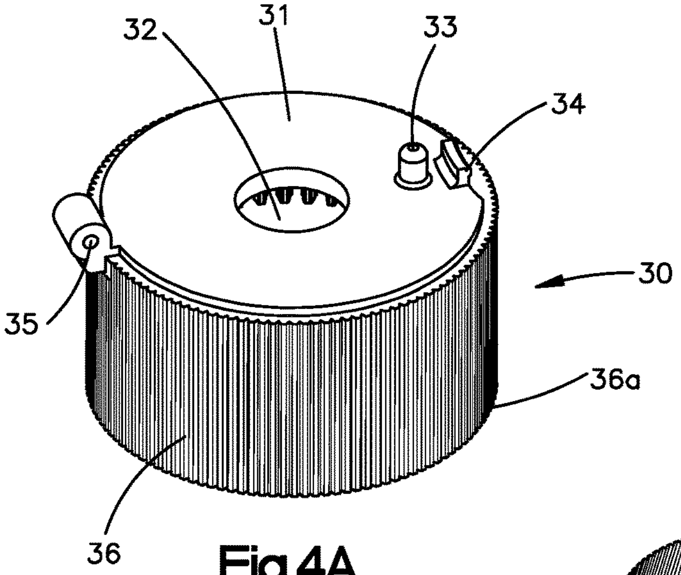
FIG. 4A-4C show different views of the outer cap, with FIG. 4A showing a top, side view; 4B showing an underside view of the outer cap.
Figure 4B:
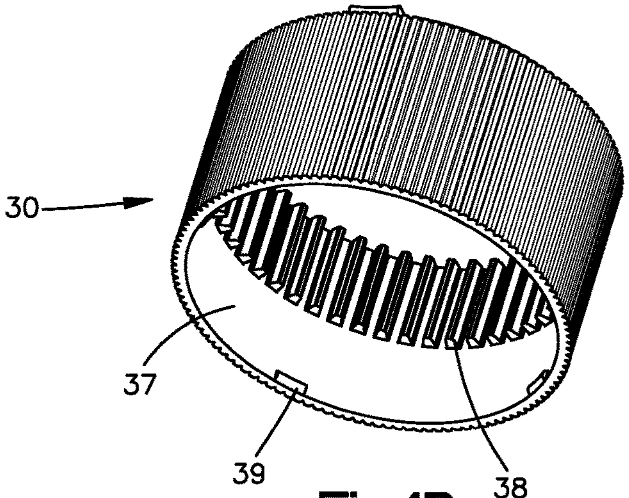
Figure 4C:
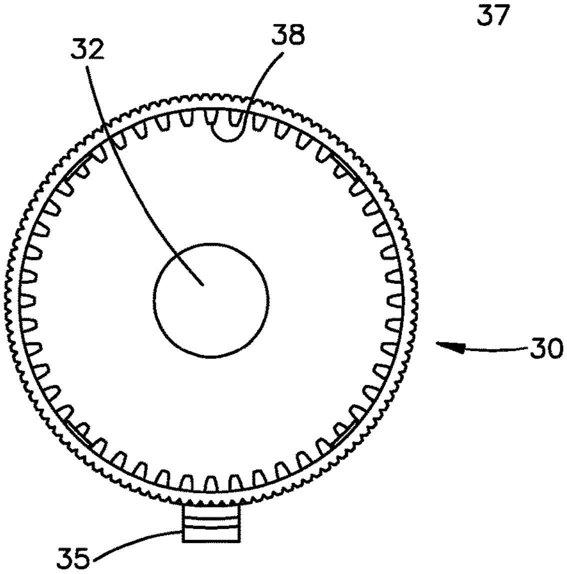

FIG. 4A-4C show different views of the outer cap 30, with FIG. 4A showing a top, side view; 4B showing an underside view of the outer cap 30; and FIG. 4C showing a bottom view. As shown in FIG. 4A, the outer cap 30 includes a preferred circular shape having a top surface 31 and side walls 36. The top surface 31 includes a medicine or pill exit port 32 that includes a preferred circular shape and is of sufficient size to allow medicine inside the medicine bottle 50 to exit. The top surface 31 of the outer cap 30 also includes a sound board switch actuator 33 that includes a male protrusion that goes in and out of opening 3 to actuate the recorded message when the flip top cap 1 is opened. A snap-fit member 34 is also included on a top surface 31 to connect the outer cap 30 to the flip top cap 1. The outer cap 30 also includes a hinge assembly 35 that corresponds with the hinge assembly 2 on the flip top cap 1 to allow the "flip" top operation to occur. In addition, the side walls 36 have a knurled design 36*a* to allow a user to grip the outer cap 30 during the medicine loading and medicine delivery operations as described in more detail below with respect to FIGS. 11 and 12.

As best shown in FIGS. 4B and 4C, an inner circumference of an interior wall 37 of the side wall 36 includes gear teeth 38 designed to engage the gear teeth on the pill delivery gear described below. The gear teeth 38 include the preferred design shown in FIGS. 4B and 4C, the design of which includes gear teeth 38 covering the entire inner circumference of the interior wall as shown in FIG. 4C and having a gear tooth length of approximately half the width of the side wall 32 as shown in FIG. 4B. A person of ordinary skill in the art will readily understand that the gear teeth length may vary and include a ¼, ½, ¾, or full length of the side wall 36. In addition, the gear teeth 38 do not need to span the entire inner circumference of the inside surface 37 shown in FIG. 4B; the embodiments of the invention includes any designs from one-half (e.g., 180 degrees) to the entire inner circumference or 360 degree inner design. The inside surface 37 of the side wall 36 includes snaps 39 to allow the outer cap 30 to be snapped/connected to the inner cap 30.

Figure 5A:
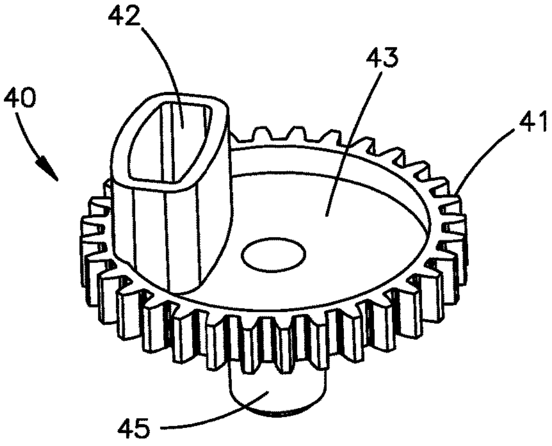
FIGS. 5A-5D show different views of the pill delivery gear, with FIG. 5A showing a top, side view.
Figure 5B:
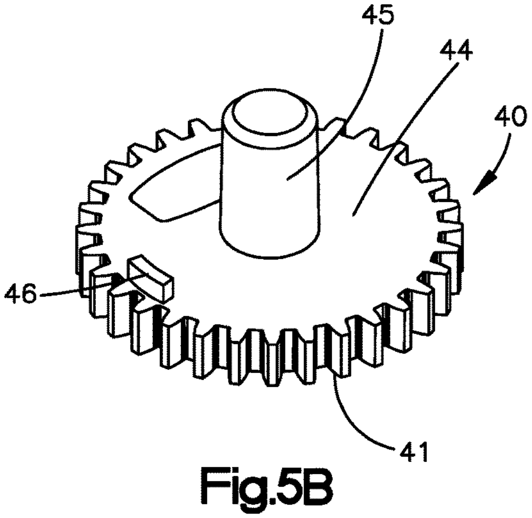
Figure 5C:
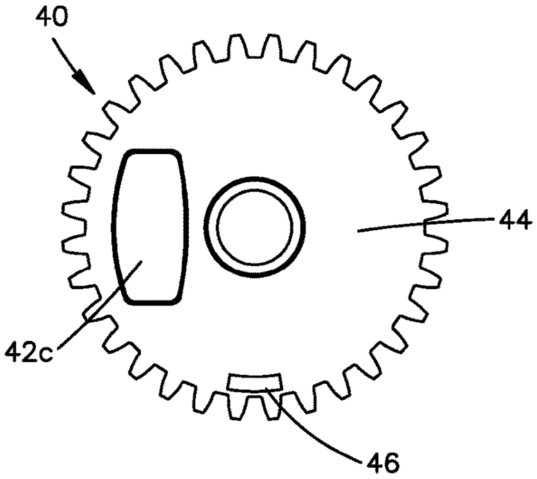
Figure 5D:
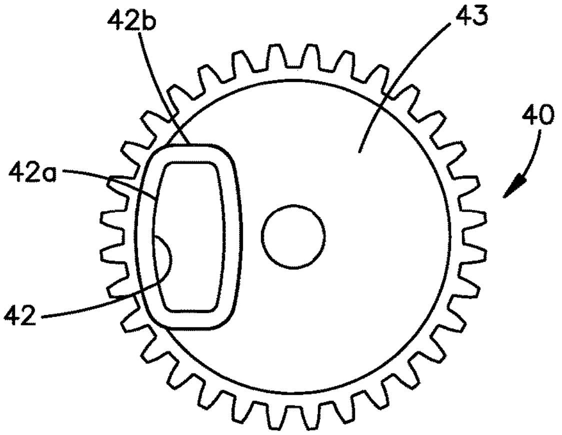

FIGS. 5A-5D show different views of the pill delivery gear 40, with FIG. 5A showing a top, side view; FIG. 5B showing a bottom, side view; FIG. 5C showing a bottom view; and FIG. 5D showing a top view. As shown in the figures, the pill delivery gear 40 includes gear teeth 41 designed to engage the gear teeth 38 on the inside surface 37 of the outer cap 30. As best shown in FIG. 5A, a medicine chamber 42 is included on an upper surface 43 of the pill delivery gear 40. A preferred design of the chamber 42 is shown in FIG. 5A and includes a rectangular design with horizontal 42*a* and vertical 42*b* walls (shown in FIG. 5D) protruding upwardly away from the surface 43 for a predetermined distance, with an opening 42*c* (shown in FIG. 5C) in the chamber 42 to allow medicine in the bottle to be dispensed. A person of ordinary skill in the art will readily understand that the chamber's preferred design allows for the dispensing of preferably rectangular-shaped pills; however, the embodiments of the present invention also include a chamber having different designs including circular/cylindrical and oval shapes to allow for the dispensing of corresponding circular or oval-shaped pills. In addition, the size of the chamber can be modified to dispense pills of different sizes.

As best shown in FIG. 5B, a lower surface 44 of the pill delivery gear 40 includes a circular post 45 protruding preferably from a center portion of the lower surface 44 of the pill delivery gear 40. The post 45 is designed to be inserted into the cylindrical pocket of the inner cap 20 as described in more detail below. The lower surface 44 also includes a tab 46 protruding from the lower surface 44. The preferred design of the tab 46 shown in FIGS. 5B and 5C includes a substantial rectangular shape for fitting in a slot 52 in the inner cap 50 as described in more detail below. A person of ordinary skill in the art will readily understand that the tab 46 can include many different sizes and shapes including a circular design as long as the tab fits in a slot 52 in the inner cap 50.

Figure 6C:
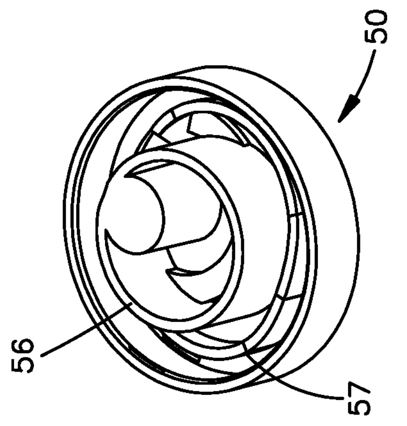
FIGS. 6A-6E show different views of the inner cap, with FIG. 6A showing a view from the bottom and side.
Figure 6B:
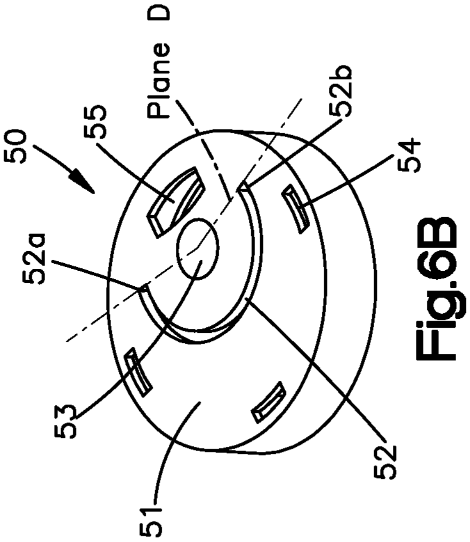
Figure 6A:
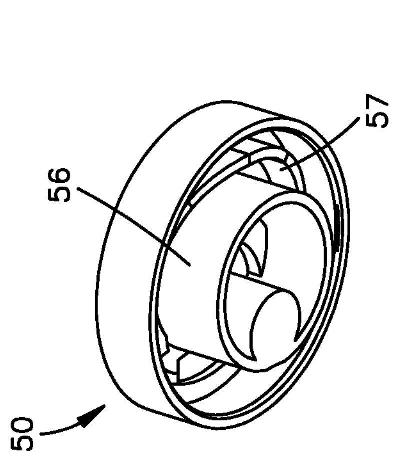
Figure 6E:
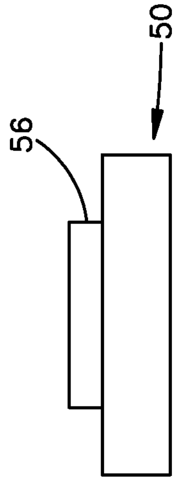
Figure 6D:
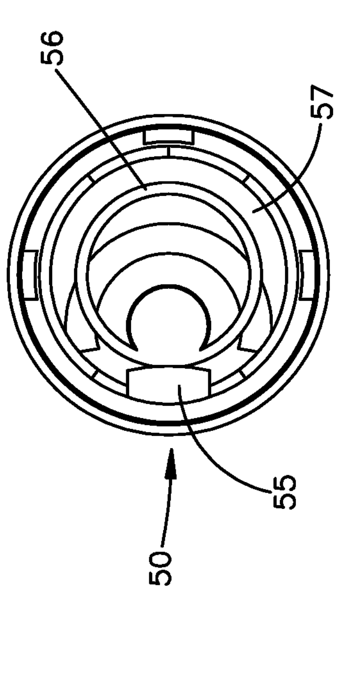

FIGS. 6A-6E show different views of the inner cap 50, with FIG. 6A showing a view from the bottom and side; FIG. 6B from the side and top; FIG. 6C from the side and bottom; FIG. 6D from the bottom; and FIG. 6E from the side. As best shown in FIG. 6B, a top surface 51 of the inner cap 50 shows a cylindrical opening 53 designed to receive the post 45 from the pill delivery gear 40. A slot 52 having a preferred crescent shape design is also shown in FIG. 6B. More specifically, the slot 52 includes a semi-circular, crescent shape, with the ends 52*a*, 52*b* of the slot 52 sharing a plane D with a center portion of cylindrical opening 53. FIG. 6B shows different openings 54 on the exterior ring of the inner cap 50 to receive tabs on a top surface of the bottle 60 to prevent rotation of the inner cap 50. FIG. 6B also shows an opening 55 designed to allow a pill in the medicine bottle 60 to pass there through and to the chamber 42 in the pill delivery gear 40. A shape of the opening 55 includes a similar design to the shape of the opening 42*c* in the chamber 42 of the pill delivery gear 40. However, as noted above, a person of ordinary skill in the art will readily understand that the shape of the opening can include many different shapes known in the art including circular and oval, and the opening 55 may vary in size from one embodiment to the other. FIGS. 6A and 6C show the post 45 from the pill delivery gear 40 disposed in the opening 53. In addition, FIGS. 6C and 6E show a cylindrical housing 56 that extends downward past a lower surface of the inner cap 50. Moreover, FIG. 6C show a series of ramps 57 or passageways that receive a pill from the medicine bottle 60 and allow the pill to proceed to the opening 55 in the inner cap 50.

Figure 7A:
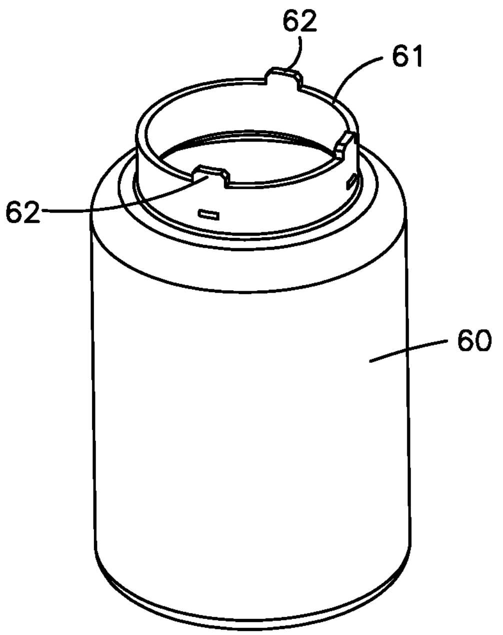
FIGS. 7A-7D show different views of a medicine bottle, with FIG. 7A showing a top, side view, FIG. 7B showing a top view.
Figure 7B:
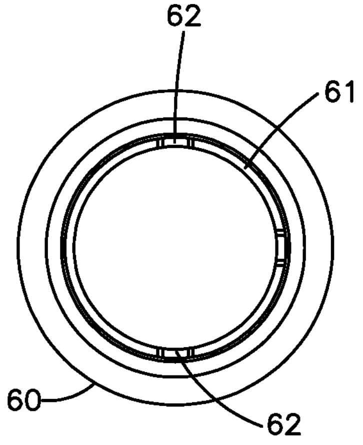
Figure 7C:
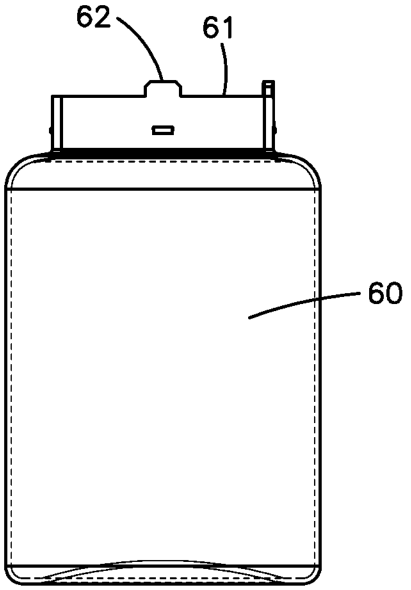
Figure 7D:
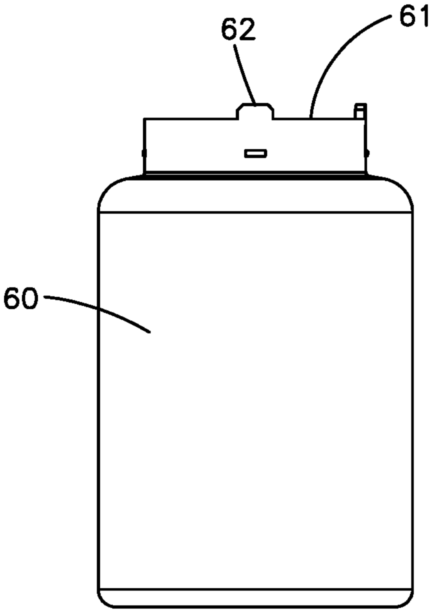

FIGS. 7A-7D show different views of a medicine bottle, with FIG. 7A showing a top side view, FIG. 7B showing a top view; and FIGS. 7C and 7D showing different side views. A person of ordinary skill in the art should note that for some embodiments of the present invention, the bottle and upper circular ring 61 of the bottle for connection to the inner cap 50 is not a critical aspect of the design as the Smart Cap may be sold independent from a medicine bottle. However, in other embodiments, the Smart Cap will be included will the medicine bottle 60 and therefore specific designs at the top of the bottle may include a circular ring 61 with tabs 62 for engaging openings 54 in the inner cap 50 to prevent the inner cap 50 from rotating.

Figure 8:
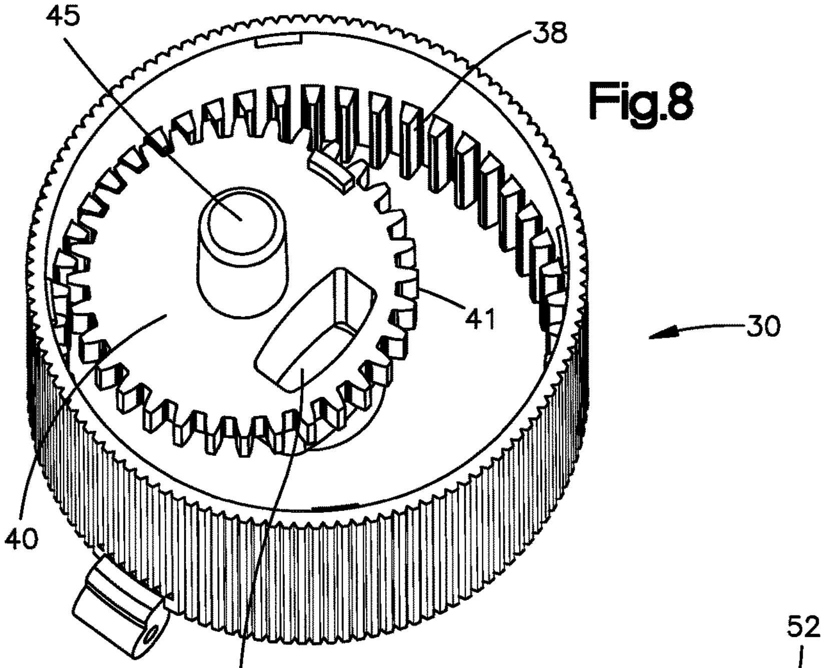
FIG. 8 shows a view from under the outer cap showing the gears of the pill delivery gear in mesh with the inner circumferential gears of the outer cap.
Figure 10:
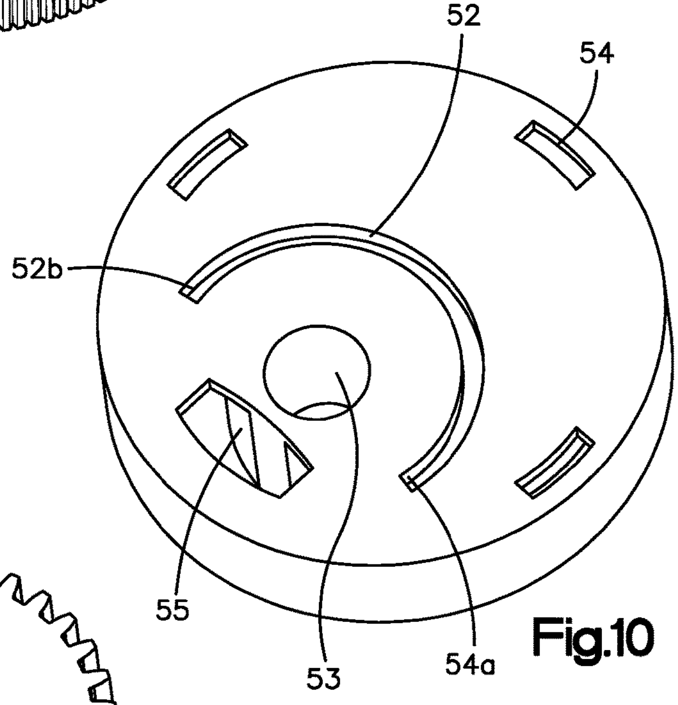
FIG. 10 shows a side, top view of the inner cap.
Figure 9:
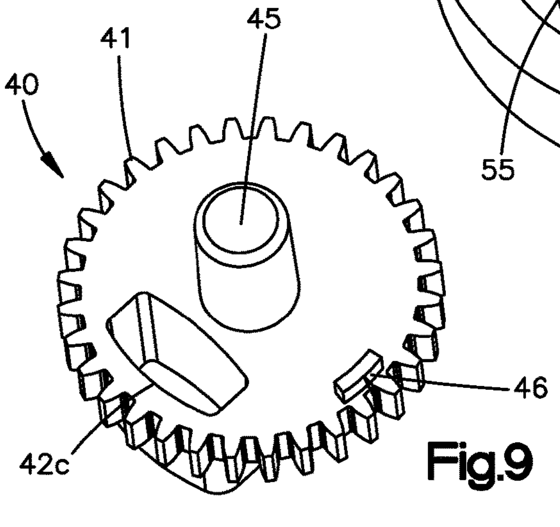
FIG. 9 shows a bottom view of the pill delivery gear.

FIG. 8-10 show additional views of the aspects of the invention, with FIG. 8 showing a view from under the outer cap 30 showing the gears 41 of the pill delivery gear 40 in mesh with the inner circumferential gears 38 of the outer cap 30. As the user rotates the outer cap 30, the pill delivery gear 40 rotates accordingly. Moreover, in FIG. 8, the opening 42*c* of the chamber 42 is in line with the opening 32 of the outer cap 30. FIG. 9 shows a bottom view of the pill delivery gear 40 and FIG. 10 shows a side, top view of the inner cap 50. FIGS. 9 and 10 views are shown on the same page to note that the tab 46 rotates in the crescent-shaped slot 52 in the inner cap 50. The inner cap 50 is fixed to the bottle 60 and cannot rotate. When the pill delivery gear 40 rotates (i.e., driven by rotation of the outer cap 30 by the user), the tab 46 travels or rides in slot 52 which limits the rotation of the pill delivery gear 40 to about 180 degrees.

Figure 11:
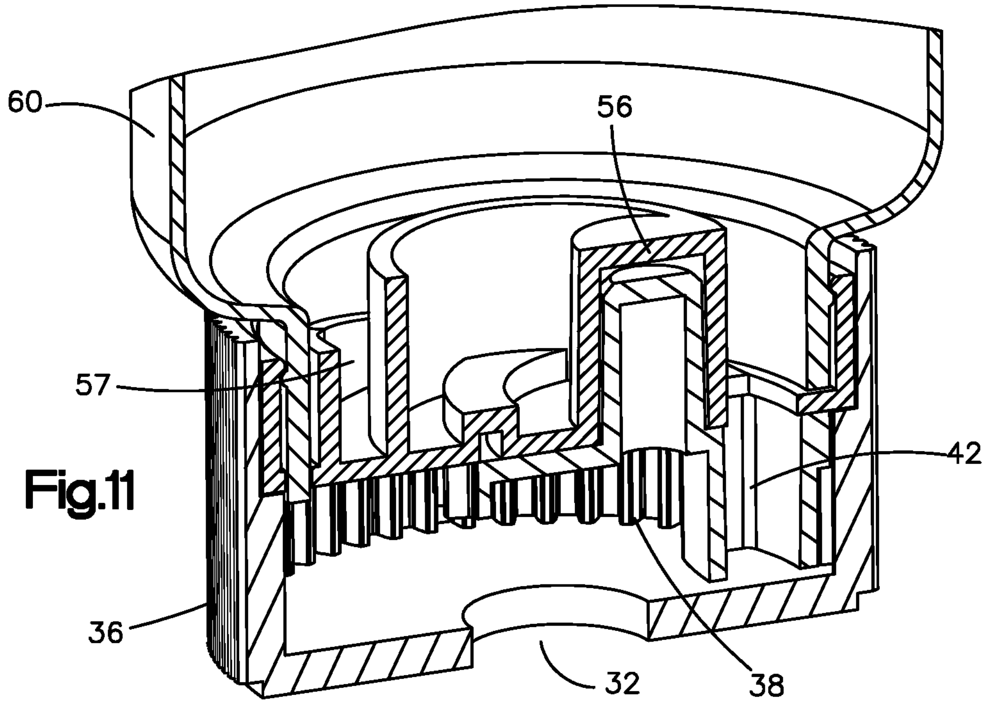
FIG. 11 shows a cut-out view of an embodiment of the cap attached to the bottle, upside down, showing the cap and features therein in a pill loading position.

FIG. 11 shows a cut-out view of an embodiment of the cap attached to the bottle, upside side down, showing the cap and features therein in a pill loading position. The flip top cap 1 is hidden for clarity with respect to this description but is described above. When the outer cap 30 is rotated by a user, the pill delivery gear 40 rotates due to the engagement of the gear teeth 41, 38. As mentioned above, the range of motion of the pill delivery gear 40 is limited to about 180 degrees. FIG. 11 shows the pill loading position. In this position, a pill will fall from the bottle into the inner cap 50 and down to the bottom of the ramp/passageways 57 (see FIGS. 6A and 6D) in the inner cap 50 and then fall into the chamber 42 of the pill delivery gear 40.

Figure 12:
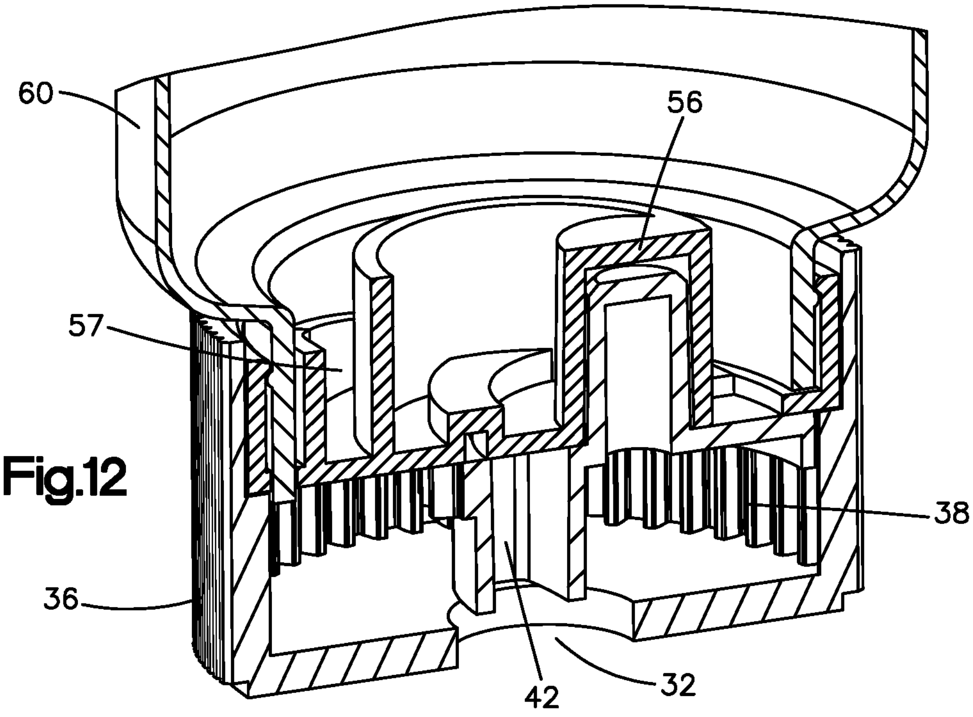
FIG. 12 shows a cut-out view of an embodiment of the cap attached to the bottle, upside down, showing the cap and features therein in a pill delivery position.

FIG. 12 shows a cut-out view of an embodiment of the cap attached to the bottle, upside side down, showing the cap and features therein in a pill delivery position. In this position, the pill delivery gear 40 has been rotated about 180 degrees, driven by a rotation of the outer cap 30 by a user. As shown in FIG. 12, both the outer cap 30 and the pill delivery gear 40 have gear teeth 38, 41 which are meshed. In this position, the pill will now fall from the chamber 42 in the pill delivery gear 40 and through the opening 32 in the center of the outer cap 30.

The invention claimed is:

1. A medicine bottle cap comprising:

a flip-top assembly including:

- a flip top inner cap having a top surface and side walls, wherein the top surface of the flip top inner cap includes a first plurality of openings,
- a sound circuit board that includes at least two batteries and a plurality of switches,
- a speaker wired to the sound circuit board,
- a flip top outer cap having a top surface and side walls, wherein the top surface of the flip top outer cap includes a second plurality of openings;

an outer cap pivotably attached to the flip top assembly and having a top surface and side walls, wherein the top surface of the outer cap includes a medicine exit port disposed in a center of the top surface of the outer cap, wherein an interior wall of the side wall of the outer cap includes a first plurality of gear teeth;

a pill delivery gear having a second plurality of gear teeth for engaging the first plurality of gear teeth in the outer cap, further having a chamber having an opening for medicine to pass there through, further having a circular post protruding from a center portion of a lower surface of the pill delivery gear, and further comprising a tab protruding from the lower surface of the pill delivery gear; and an inner cap having a top surface and a lower surface, the top surface of the inner cap having an opening designed to receive the post from the pill delivery gear, further comprising a slot for receiving the tab from the pill delivery gear, and further comprising an opening designed to allow medicine in a medicine bottle to pass there through.

2. The medicine bottle cap according to claim 1, wherein the outer cap is pivotably attached to the flip top assembly via a hinge.

3. The medicine bottle cap according to claim 1, wherein the medicine bottle cap is connected to a medicine bottle.

4. The medicine bottle cap according to claim 1, wherein the flip top inner cap includes a circular shape.

5. The medicine bottle cap according to claim 1, wherein the flip top inner cap includes at least one notch included in a section of the side wall.

6. The medicine bottle cap according to claim 1, wherein, when the flip top cap is in the closed position, an actuator depresses a switch on the sound circuit board, and wherein, when the flip top cap is moved to the open position, a recorded message plays.

7. The medicine bottle cap according to claim 1, wherein the top surface of the outer cap also includes a sound board switch actuator and a snap-fit member to connect the outer cap to the flip top outer cap.

8. The medicine bottle cap according to claim 1, wherein the side walls of the outer cap have a knurled design.

9. The medicine bottle cap according to claim 1, wherein the first plurality of gear teeth are disposed on a 180 degree to 360 degree inner circumference of the interior wall of the side wall of the outer cap.

10. The medicine bottle cap according to claim 1, wherein the chamber includes different designs including circular, rectangular and oval to allow for the dispensing of different sizes and different shapes of medicine.

11. The medicine bottle cap according to claim 1, wherein the slot has a crescent shape.

* * * * *